May 18, 1954 — W. C. SCHAFFER ET AL — 2,678,657
LIQUID FUEL DISTRIBUTING APPARATUS
Filed April 8, 1948 — 2 Sheets-Sheet 1

INVENTORS
WILLIAM T. STARK.
WILLIAM C. SCHAFFER.
BY
ATTORNEY

May 18, 1954   W. C. SCHAFFER ET AL   2,678,657
LIQUID FUEL DISTRIBUTING APPARATUS
Filed April 8, 1948   2 Sheets-Sheet 2

INVENTORS
WILLIAM T. STARK
WILLIAM C. SCHAFFER
BY Victor D. Behn
ATTORNEY

Patented May 18, 1954

2,678,657

UNITED STATES PATENT OFFICE 2,678,657

LIQUID FUEL DISTRIBUTING APPARATUS

William C. Schaffer, Fairlawn, and William T. Stark, Pompton Lakes, N. J., assignors, to Curtiss-Wright Corporation, a corporation of Delaware Application April 8, 1948, Serial No. 19,814

2 Claims. (Cl. 137—99)

This invention relates to liquid distributing apparatus and is more particularly directed to fuel distributing apparatus for combustion engines. The invention is described in connection with a gas turbine power plant for aircraft but as will appear, the invention is not limited to this specific application.

In a gas turbine power plant, it is necessary to distribute the fuel supply equally between a plurality of fuel nozzles in order that the temperature distribution pattern of the combustion gases, at the discharge end of the combustion chamber, be substantially uniform or symmetrical. Irregularities in said temperature distribution pattern result in increased fuel consumption. In addition, since the power output and efficiency of a gas turbine power plant increase with increase in the average temperature of the combustion gases, any irregularity in said temperature distribution pattern necessarily reduces the maximum average temperature at which said power plant can be operated, thereby reducing its efficiency and power output.

In a conventional gas turbine power plant, controlled quantities of fuel are supplied to a manifold from which said fuel is distributed to a plurality of fuel nozzles of said power plant, said nozzles being matched in an attempt to obtain an equal division of fuel flow between said nozzles over the fuel flow operating range of the power plant. However, variations in the presure-flow characteristics of the individual nozzles cause unequal fuel distribution. Variations in said nozzle characteristics may result from any number of causes—such as manufacturing tolerances, coking, erosion, and clogging. Because gas turbine power plants operate over a wide range of fuel flows, the poppet valve type of fuel nozzle is the most desirable in order to obtain good atomization of the fuel over the entire range of fuel flow with a minimum fuel pressure. It is practically impossible, however, to obtain a matched set of poppet valve type fuel nozzles.

An object of this invention comprises the provision of a novel and improved fuel distributing apparatus which provides equal and positive division of fuel flow to a plurality of fuel nozzles regardless of variations in the pressure-flow characteristics of the fuel nozzles.

Specifically, the fuel distributing apparatus of the present invention is applied to a combustion chamber having a plurality of circumferentially-spaced fuel nozzles. The fuel distributing apparatus comprises an annular housing structure disposed co-axially relative to said fuel nozzles and within which flow dividing devices are symmetrically spaced about the axis of said housing structure. This annular construction of the fuel distributing apparatus decreases the weight and space otherwise required for said apparatus, a feature quite important for aircraft engines. Thus, with the annular construction of the fuel distributing apparatus, it may be disposed within an annular combustion chamber structure of a gas turbine power plant to provide a compact arrangement. Furthermore, because of said annular construction, the fuel line connections between said fuel distributing apparatus and said fuel nozzles may all be similar, thereby facilitating bench checking and calibration of the apparatus. Also, because of the annular construction of said apparatus, its flow dividing devices may all have substantially the same flow passages, thereby facilitating the maintenance of a precise and accurate division of flow to the fuel nozzles.

Other objects of the invention will become apparent upon reading the annexed detailed description in connection with the drawing, in which:

Figure 4 is a sectional view of a modified form of the invention.

Figure 1:
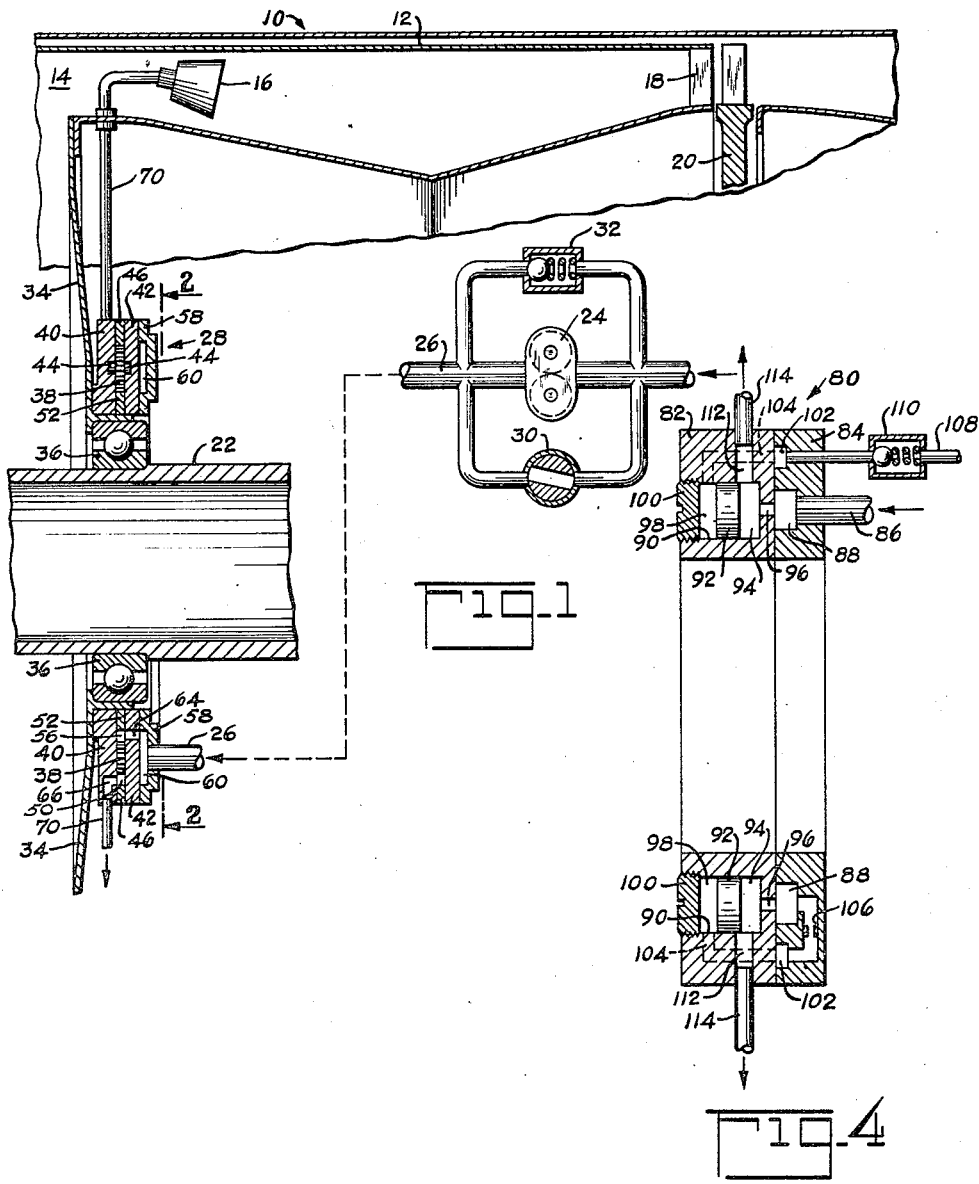
Figure 1 is an axial sectional view of a portion of a gas turbine power plant embodying the invention, said view being taken along line 1—1 of Figure 2.

Referring to the drawing, a portion 10 of a gas turbine power plant comprises an annular combustion chamber 12 having an annular inlet air passage 14 through which compressed air is supplied to said chamber. Fuel is supplied to said chamber for combustion therein through a plurality of nozzles 16 equally spaced about the axis of said chamber. The combustion chamber 12 has an annular discharge end or nozzle 18 for directing the combustion gases against the blades of a turbine rotor 20. A shaft 22, co-axial with the combustion chamber 12, provides a driving connection from said turbine rotor 20 to an air compressor assembly (not shown) for providing said combustion chamber with compressed air through its inlet opening 14. The gas turbine structure so far described is quite conventional.

A suitable fuel pump 24 is arranged to be driven from the turbine rotor 20 for supplying fuel under pressure through a conduit 26 to an annular fuel distributing housing 28. As schematically illustrated the fuel pump 24 comprises a positive displacement gear type pump and a by-pass valve 30 is controllable to regulate the rate at which fuel is supplied to the fuel distributing housing 28. A conventional pressure relief valve 32 is also connected around the pump 24.

The annular fuel distributing housing 28 is co-axially supported about the turbine shaft 22 by a fixed diaphragm 34, said diaphragm also providing a support for a bearing 36 for the shaft 22. A series of meshing spur gears 38 are journaled within the housing 28 in an endless annular arrangement co-axial with said housing. The gears 38 are disposed between plates 40 and 42 within which their stub shafts 44 are journaled. Between the plates 40 and 42 and radially outwardly of the annular arrangement of the gears 38, is an annular plate 46 fitted with minimum clearance over the tips of the teeth of the gears 38. The radially inner edge of the plate 46 is formed to provide a chamber adjacent each zone of meshing engagement of the gears, and for convenience, said chambers are alternately designated by reference numerals 48 and 50. In addition, an annular plate 52 is disposed radially inwardly of the annular arrangement of the gears 38, said plate 52 being fitted over the tips of the gear teeth and being disposed between the plates 40 and 42. The radially outer edge of the plate 52 is formed to provide a chamber adjacent each zone of meshing engagement of the gears 38. For convenience, these latter chambers are alternately designated by reference numerals 54 and 56 with the chambers 54 disposed opposite to the chambers 48 and with the chambers 56 disposed opposite to the chambers 50. The plates 46 and 52 are suitably clamped or bolted between the plates 40 and 42. In addition, the thickness of the plates 46 and 52, relative to that of the gears 38, is such that said gears can rotate freely between the plates 40 and 42 with a minimum clearance between said gears and plates. With this construction, the plates 40, 42, 46, and 52 provide a housing for the gears 38.

Another plate 58 is also clamped or bolted to the plates 40, 42, 46, and 52 to complete the fuel distributing housing 28. The plate 58 is provided with an annular groove facing the plate 42 so as to form an annular channel or manifold 60 co-axially disposed within the housing 28. The fuel supply conduit 26 opens into the annular manifold 60 from which the fuel is distributed to the gears 38 via passages 62 and 64 extending through the plate 42. Each passage 62 communicates with one of the chambers 48 and each passage 64 communicates with one of the chambers 56.

The plate 40 is provided with fuel outlet passages 66 and 68, each passage 66 communicating with one of the chambers 50 and each passage 68 communicating with one of the chambers 54. From each of the outlet passages 66 and 68, fuel is supplied to one of the fuel nozzles 16 through a conduit 70, there being one conduit 70 for each fuel nozzle. Instead of connecting each of the outlet passages 66 and 68 to an individual fuel nozzle 16, each said fuel nozzle may be supplied with fuel from an equal plurality of such passages—as for example from a pair of passages 66 and 68.

With the above construction, fuel is supplied under pressure to the annular manifold 60, within the fuel distributing housing 28, at a rate controlled by the valve 30. From the manifold 60, fuel flows through the inlet passages 62 to the chambers 48. From each chamber 48 said fuel enters the adjacent intertooth spaces of the gears 38 and the pressure of the fuel forces said gears to rotate simultaneously in the direction indicated by the arrows 72 in Figure 2, whereby the fuel trapped in said inter-tooth spaces is transported from each chamber 48 to the two adjacent chambers 50 and thence to the outlet passages 66. From the fuel inlet manifold 60, fuel is also supplied through the inlet passages 64 to the chambers 56. From each chamber 56 said fuel enters the adjacent inter-tooth spaces of the gears 38 and the pressure of said fuel helps to rotate said gears in the same direction as the fuel supplied through the inlet passages 66. Accordingly, fuel is also trapped in the intertooth spaces of the gears 38 and is transported therein from each of the chambers 56 to the two adjacent chambers 54 and thence to the outlet passages 68 communicating therewith. From the outlet passages 66 and 68 the fuel is supplied to the combustion chamber fuel nozzles 16 through the conduits 70.

Since all the inter-tooth spaces are necessarily the same and since all the gears 38 necessarily rotate at the same speed, said gears act like gear pumps to positively displace fuel at equal rates to the fuel nozzles 16 regardless of differences in the characteristics of said nozzles. Accordingly the gears 38 comprise flow dividing devices insuring an equal division of the fuel flow between the fuel nozzles 16. This assumes that there are only negligible differences in the leakage losses between each inlet passage 62 and 64 and each outlet passage 66 and 68 through the clearances between the gears 38 and the adjacent surfaces of the plates 40, 42, 46, and 52. Such leakage losses are small and in addition, because of the symmetry of the annular fuel distributing apparatus, the leakage path between each fuel inlet passage and each fuel outlet passage can be provided with substantially the same physical dimensions within the manufacturing tolerances. Accordingly, the annular construction of the fuel distributing apparatus makes it possible to minimize differences in the small fuel leakage between each pair of inlet and outlet passages through the clearances between the relatively moving parts of said apparatus. If desired, the differences in said leakage losses may be further minimized by providing an external drive for the gears so as to reduce the pressure differential between their inlet and outlet passages—for example as described in copending application Serial Number 770,737 of W. L. Weeks, filed August 26, 1947, now Patent No. 2,599,680 dated June 10, 1952.

Figure 2:
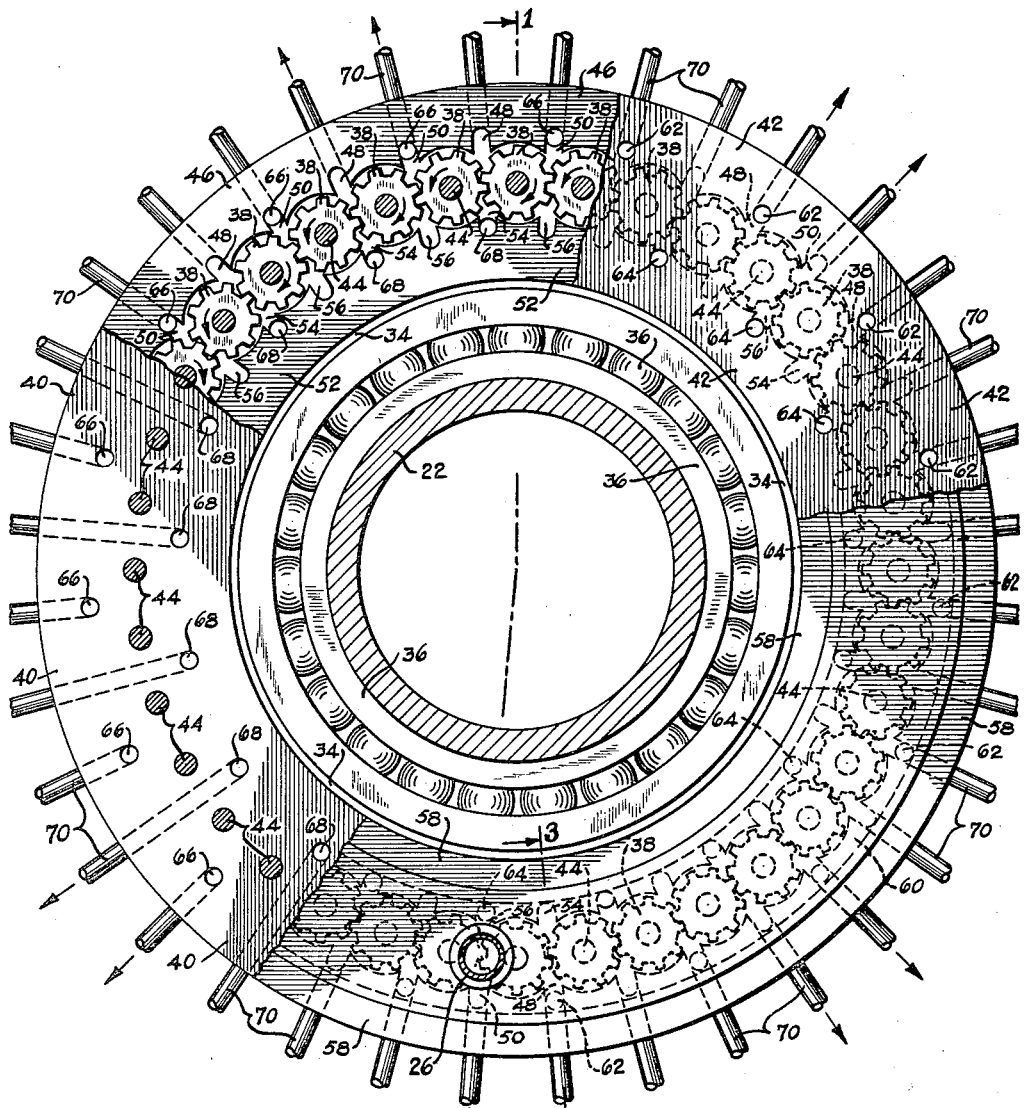
Figure 2 is an enlarged view comprising a portion taken along line 2—2 of Figure 1 and including portions taken between the various plates comprising the housing of the fuel distributing apparatus.
Figure 3:
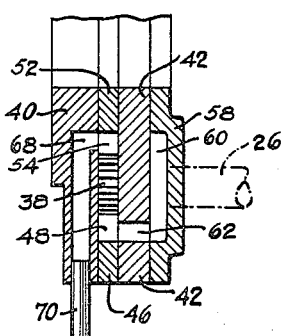
Figure 3 is a sectional view taken along line 3—3 of Figure 2.

The invention is not limited to the meshing gear type of flow dividing apparatus illustrated in Figures 1 to 3. For example, Figure 4 illustrates an application of the invention to the type of flow dividing apparatus illustrated in copending application Serial Number 778,310, of Rowe et al., filed October 7, 1947, now Patent No. 2,622,610 dated December 23, 1952. In Figure 4, the flow dividing apparatus comprises an annular housing construction 80 formed by a pair of annular plates 82 and 84 suitably clamped together, said housing 80 replacing the housing 28 of Figures 1 to 3.

Controlled quantities of fuel under pressure are supplied from a fuel conduit 86 to an annular fuel manifold 88 within the housing 80, said manifold comprising an annular channel formed in the inner surface of the plate 84. The annular plate 82 is provided with a plurality of bores 90 within which suitable pistons 92 are slidable, said bores being symmetrically spaced about the axis of the annular housing 80. The head ends 94 of the bores 90 communicate with the annular fuel manifold through identical restricted passages 96. The other end 98 of each bore 90 is closed by a plug 100 but said end communicates with a second annular manifold 102 via a passage 104. The manifold 102, like the manifold 88, comprises an annular channel formed in the inner surface of the plate 84. The lower side of said second annular manifold 102 communicates with the annular manifold 88 through a restricted orifice 106. In addition, the upper end of the annular manifold 102 is connected to a suitable drain passage 108 through a pressure relief valve 110 through which a small percentage of the fuel supplied by the conduit 86 may return to the fuel supply tank.

Each piston 92 is axially slidable within its bore 90 to control the extent to which an outlet passage 112 is uncovered by said piston. Each outlet passage 112 communicates with a fuel nozzle through a conduit 114. With this construction, the position of each piston 92 is determined solely by the fuel pressure differential acting thereon. Therefore the pistons 92 automatically assume positions relative to their respective outlet passages 112 such that the fuel pressure drops, across their respective identical restricted inlet passages 96, are the same. That is, the pistons 92 automatically operate to effect an equal division of fuel flow to their outlet passages 112. This operation of the flow dividing system of Figure 4 is more fully described in the aforementioned copending application of Rowe et al.

In both modifications of the invention, the annular fuel distributing apparatus is co-axially disposed within and is surrounded by the annular combustion chamber 12 thereby providing a compact arrangement. Also with this annular co-axial arrangement, the fuel conduits 70 of Figures 1 to 3 and the fuel conduits 114 of Figure 4 are all the same length so that it is possible to accurately bench check and calibrate the fuel distributing apparatus prior to its installation.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. Liquid distributing apparatus comprising a housing structure having an inlet passageway and a plurality of outlet passageways; an endless annular series of meshing rotatable gears disposed within said housing; a plurality of first chambers disposed within said housing radially outwardly of said annular series of gears, there being one such chamber for and in communication with the zone of meshing engagement of each pair of meshing gears on the radially outward side of said annular series of gears with alternate first chambers comprising inlet chambers in communication with said inlet passageway and with the remaining first chambers comprising outlet chambers each communicating with one of said outlet passageways such that each gear transports liquid from its associated inlet first chamber to its associated outlet first chamber; and a plurality of second chambers disposed within said housing radially inwardly of said annular series of gears, there being one such second chamber for and in communication with the zone of meshing engagement of each pair of meshing gears on the radially inward side of said annular series of gears with the alternate second chambers disposed radially inwardly of the outlet first chambers comprising inlet chambers in communication with said inlet passageway and with the remaining second chambers comprising outlet chambers each communicating with an outlet passageway such that each gear also transports liquid from its associated inlet second chamber to its associated outlet second chamber.

2. Liquid distributing apparatus comprising a housing structure having an inlet passageway and a plurality of outlet passageways; an endless annular series of meshing rotatable gears disposed within said housing; a plurality of first chambers disposed within said housing on the radially outer side of said annular series of gears, there being one such chamber for each pair of meshing gears with alternate first chambers comprising inlet chambers communicating with said inlet passageway and with the remaining first chambers comprising outlet chambers communicating with said outlet passageways such that each gear transports liquid from its associated inlet first chamber to its associated outlet first chamber; and a plurality of second chambers disposed within said housing on the radially inner side of said annular series of gears, there being one such second chamber for each pair of meshing gears with the alternate second chambers disposed radially inwardly of the outlet first chambers comprising inlet chambers communicating with said inlet passageway and with the remaining second chambers comprising outlet chambers communicating with said outlet passageways such that each gear also transports liquid from its associated inlet second chamber to its associated outlet second chamber.

References Cited in the file of this patent

UNITED STATES PATENTS

| Number | Name | Date |
| --- | --- | --- |
| 705,890 | Zoelly | July 29, 1902 |
| 1,937,367 | Vickers | Nov. 28, 1933 |
| 2,185,015 | Low | Dec. 26, 1939 |
| 2,291,578 | Johnson | July 28, 1942 |
| 2,344,465 | Lauck | Mar. 14, 1944 |
| 2,400,485 | Cardillo | May 21, 1946 |
| 2,404,334 | Whittle | July 16, 1946 |